April 12, 1927.  F. HODGKINSON  1,623,999
TURBINE
Filed Dec. 27, 1924
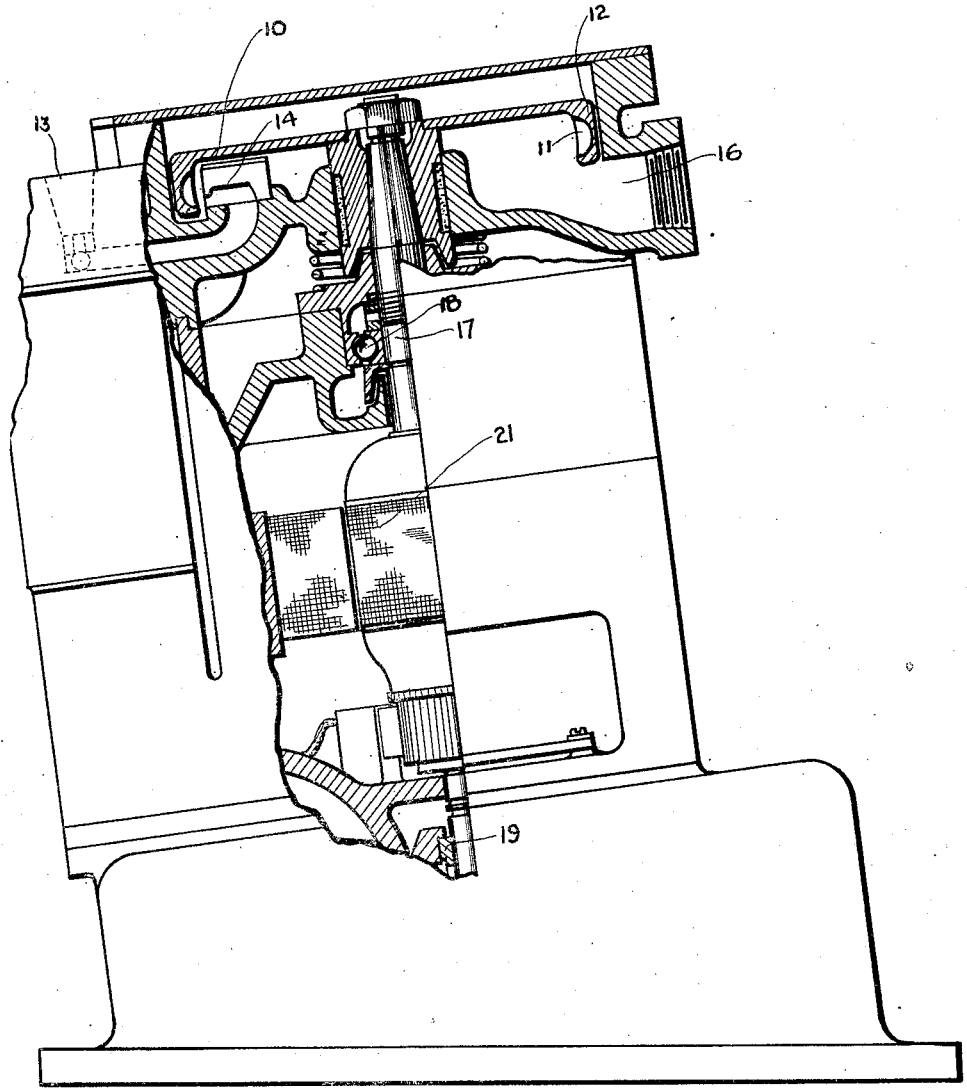
WITNESSES:
W. S. Beckley
F. Hodgkinson
INVENTOR
BY D. C. Davis
ATTORNEY Patented Apr. 12, 1927.

1,623,999

UNITED STATES PATENT OFFICE.

FRANCIS HODGKINSON, OF SWARTHMORE, PENNSYLVANIA, ASSIGNOR TO WESTINGHOUSE ELECTRIC & MANUFACTURING COMPANY, A CORPORATION OF PENNSYLVANIA.

TURBINE.

Application filed December 27, 1924. Serial No. 758,406.

My invention relates to elastic fluid turbines, more particularly to the means of mounting the rotor and shaft of the same and has for its object the provision of apparatus of the character designated which shall embody the advantages of a vertical turbine and avoid the oscillatory motion of the shaft incident to the operation of such turbines.

Apparatus embodying features of my invention is illustrated in the accompanying drawing in which the single figure is a sectional view of a turbine with a generator mounted on a common shaft and made in accordance with my invention.

As is well known in the art, it often occurs that it is desirable to mount a turbine rotor so that its axis of rotation is vertical. It has been found, however, that a rotating shaft disposed truly vertically has a wobbling or precessive motion, which interferes with its smooth running, resulting in vibration of the revolving parts. While this may be remedied in part, at least, by a careful adjustment of minimum bearing clearances, such a method is obviously tedious and objectionable and extreme difficulty has been encountered in attempting to so design the bearings as to prevent this wobbling or precessive motion.

In accordance with my invention, I overcome the aforementioned difficulty by disposing the turbine shaft approaching the vertical, but inclined to such a degree as to displace its center of gravity and to cause it to bear against one side of the bearing. Due to inclination of the axis, it is impossible for the rotor to precess, describing a conical path whose axis is vertical. Hence inclination of the axis imposes a restraint thereon and substantially avoids any precessional effects.

Thus the rotor journals will have a definite position in the bearings and I may admit lubricant at a point or points of no pressure. The amount of bearing clearance must be sufficient for an oil film but may be in excess of this to any reasonable extent without interfering with the smooth operation of the machine.

Referring now to the drawing, I show a turbine having a rotor 10, said rotor having a series of blades 11 milled into the inner periphery of a flange 12, provided on the rotor. Motive fluid is admitted to the turbine at 13 and is expanded and directed against the blades 11 by a nozzle 14. After doing useful work, the motive fluid is exhausted through an exhaust opening 16. The rotor 10 is provided with a shaft 17 having a supporting ball-bearing 18 toward its upper end and a sleeve guide bearing 19 near its lower end. It is plain to be seen from the drawing, that the shaft 17 is so disposed as to approach an angle of 90° from the horizontal, but at the same time that it leans sufficiently so that a part of its weight bears against one side of the bearing 18. At 21, I show a generator which may also be mounted upon the shaft 17 between the bearings 18 and 19. In this manner, the turbine and generator operate together, and both have substantially the advantages of rotation about a vertical axis without its disadvantages.

While I have illustrated a particular type of turbine the invention is not restricted to this and is applicable to any type of turbine and generator or motor generator set, or in fact any rotor that it is desired to operate vertically.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. The combination of a rigid frame-work adapted to be secured to a suitable support, upper and lower aligned bearings carried by the frame-work, a spindle fitting the bearings, and a rotor carried by the spindle and arranged above the lower bearing, the axis of the spindle and of said bearings being slightly inclined with respect to the vertical to avoid vibration due to precessional movements and consequent vibration of the spindle with respect to the upper bearing.

2. In a turbine, the combination of a rigid stator structure, upper and lower aligned bearings carried by said structure, a spindle fitting the bearings, and a rotor carried by the spindle and arranged above the lower bearing, the axis of the spindle and of said bearings being slightly inclined with respect to the vertical to avoid vibration due to precessional movements of the spindle with respect to the upper bearing.

3. In a turbine, the combination of a rigid stator structure, upper and lower aligned bearings carried by said structure, a spindle fitting the bearings, and a rotor carried by the spindle and arranged above the upper bearing, the axis of the spindle and of said bearings being slightly inclined with respect to the vertical to avoid vibration due to precessional movements of the spindle.

In testimony whereof, I have hereunto subscribed my name this ninth day of December 1924.

FRANCIS HODGKINSON.